No. 838,191. PATENTED DEC. 11, 1906.
P. KIRKEGAARD.
MERCURY FEEDER FOR ORE CRUSHERS.
APPLICATION FILED SEPT. 17, 1904.

2 SHEETS—SHEET 1.

WITNESSES:

INVENTOR
P. Kirkegaard.
BY
Rosenbaum & Stockbridge
ATTORNEYS

No. 838,191. PATENTED DEC. 11, 1906.
P. KIRKEGAARD.
MERCURY FEEDER FOR ORE CRUSHERS.
APPLICATION FILED SEPT. 17, 1904.
2 SHEETS—SHEET 2.
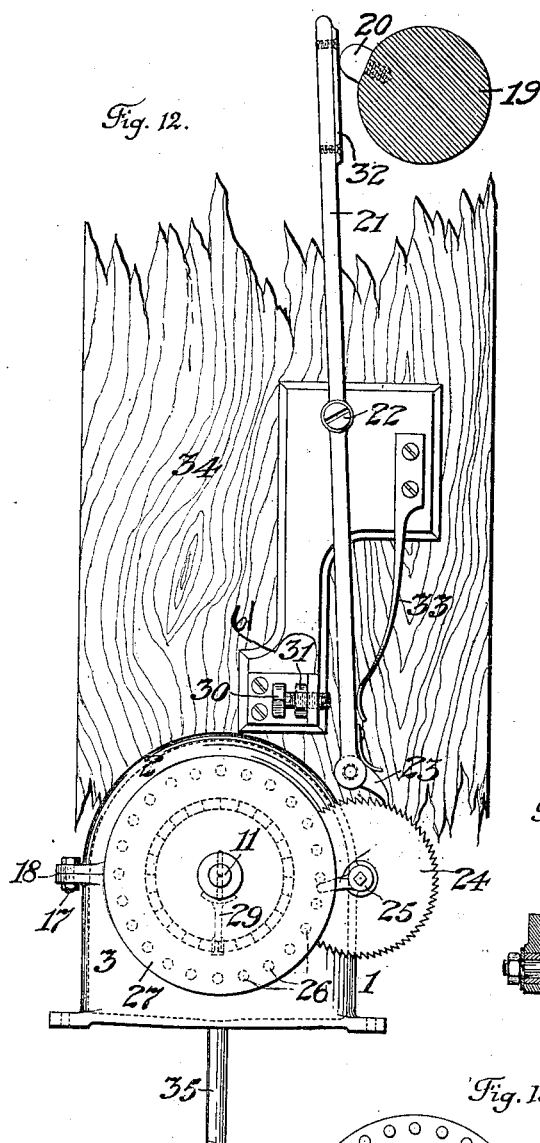
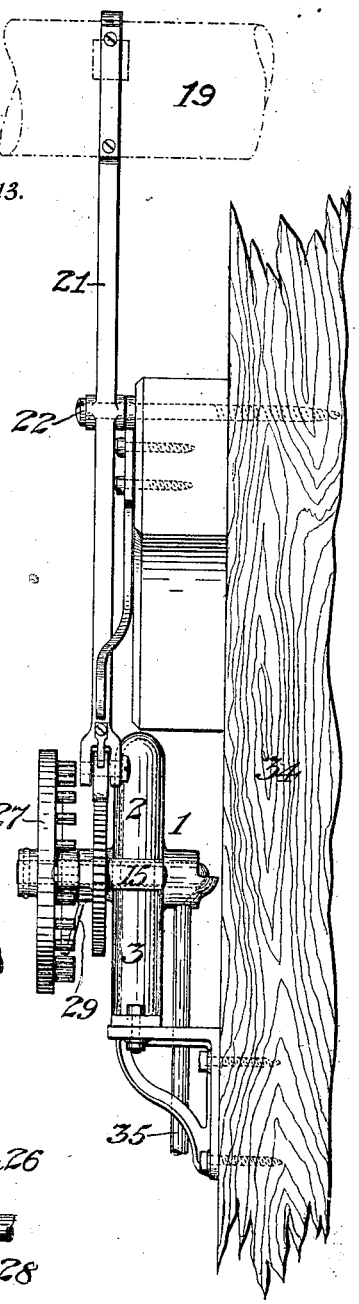
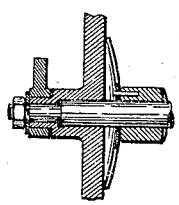
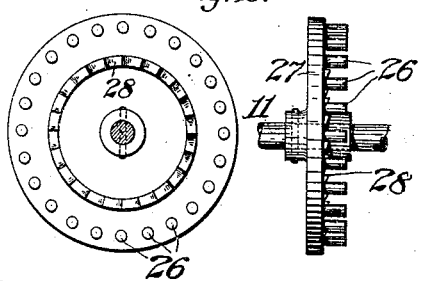
WITNESSES:
INVENTOR
BY
ATTORNEYS

UNITED STATES PATENT OFFICE.

PETER KIRKEGAARD, OF DELORO, ONTARIO, CANADA.

MERCURY-FEEDER FOR ORE-CRUSHERS.

No. 838,191.   Specification of Letters Patent.   Patented Dec. 11, 1906.

Application filed September 17, 1904. Serial No. 224,885.

*To all whom it may concern:*

Be it known that I, PETER KIRKEGAARD, a citizen of the United States, residing at Deloro, Ontario, in the county of Hastings and Dominion of Canada, have invented certain new and useful Improvements in Mercury-Feeders for Ore-Crushers, of which the following is a full, clear, and exact description.

The invention herein described relates to certain new and useful apparatus for supplying mercury to ore-crushing machinery, such as stamps and other ore-reducing machines, for the purpose of forming amalgam with the precious metals, gold and silver.

The object of the present invention is to provide accurate and reliable means for supplying mercury in fixed and predetermined quantities at regular intervals for the purpose of recovering gold or silver, or both, by amalgamation with mercury.

The apparatus which I have invented acts automatically and can be adjusted to supply a fixed amount of mercury to the ore, the said amount being subject to regulation in advance, depending upon the quantity of ore and the amount of gold or silver which it contains. Should it be found that the mercury is being supplied to the ore in too small quantities for proper amalgamation, the amount of mercury can be readily increased, and, on the other hand, should the quantity of mercury supplied be excessive the amount can be reduced without interfering with any other part by a simple process of changing the speed of delivery of the mercury, as will be fully explained hereinafter. Moreover, the apparatus may be applied to other uses besides that above mentioned, although it is especially adapted to such use.

Figure 1:
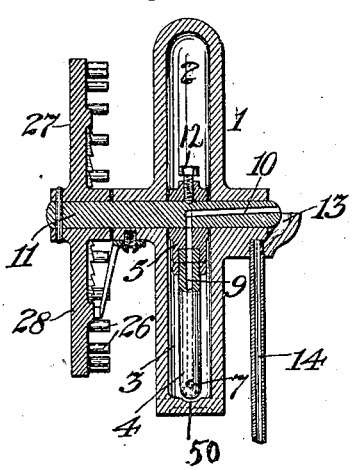
Figure 2:
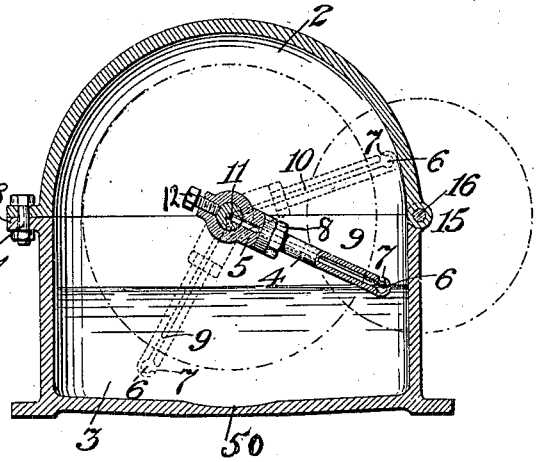
Figure 3:
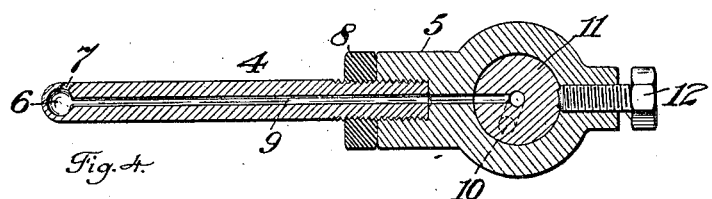
Figure 4:
Figure 5:
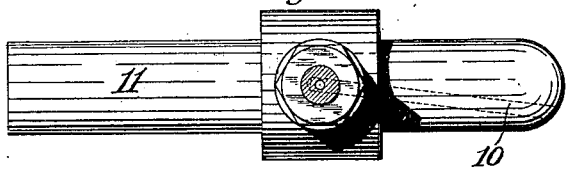
Figure 6:
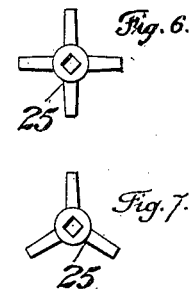
Figure 7:
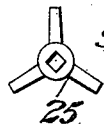
Figure 8:
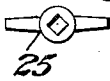
Figure 9:
Figure 11:
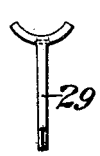
Figure 10:
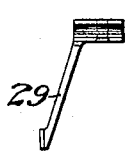

In the drawings which illustrate the invention, Figure 1 is a transverse section of a mercury-reservoir combined with means for delivering mercury at intervals from the said reservoir to stamp-mills or other ore-crushing machinery. Fig. 2 is a vertical section of the same. Fig. 3 is a longitudinal section of a mercury-feeding arm, showing the supporting-shaft of the said arm in cross-section. Fig. 4 is a detail view of a portion of the said arm. Fig. 5 is a detail view showing the main shaft or spindle. Figs. 6, 7, 8, 9, and 10 are details of different forms of driving mechanism. Fig. 11 shows, in side and end elevation, a spring-pawl which forms a part of my device. Figs. 12 and 13 are respectively front and side elevations of the driving mechanism. Fig. 14 is a detail sectional view of certain of the parts; and Fig. 15 shows, in side and end elevation, the construction of the operating-wheel.

Referring to the drawings, 1 is a reservoir adapted to contain mercury, the said reservoir being made in two parts 2 and 3, hinged together for convenience of supplying the mercury and so that it can be opened without disturbing any other part, and preferably made of iron. The reservoir is so designed that it will hold sufficient mercury to serve for at least twelve hours and in many cases for several days operation, depending upon the quantity of mercury needed.

Inside the mercury-reservoir is a feeding-arm 4, held in a socket 5, the latter being secured by a set-screw 12 or other means to a shaft 11, traversing the reservoir from side to side and mounted in the walls of the said reservoir, suitable extensions of the said walls being provided to serve as bearings for the said shaft. The arm 4 is generally screwed into the socket 5, the object of this construction being to facilitate the changing of the arm, so as to vary the size of cup or quantity of the feed of mercury, according to the requirements of the service. By this construction the apparatus adapts itself to a large range of uses without disturbing the other parts of the machine.

The arm 4 is provided at or near its outer end with a cup or receptacle 6 for taking up a predetermined amount of mercury at each revolution of the arm. The mercury itself is contained in the lower part of the receptacle, as clearly shown in Fig. 2, and the arm passing through it under the influence of the driving mechanism hereinafter to be described takes up at each revolution a certain quantity of mercury from the mass contained in the reservoir, the amount taken up depending upon the size of the cup or receptacle 6. The opening 7 into the cup is made at an angle of about forty-five degrees to the arm for the purpose of regulating the amount of mercury taken up at each revolution, so that it shall be practically the same whether there is much or little mercury in the reservoir. To secure the arm 4 in the socket 5, a jam-nut 8 or other suitable means will generally be provided.

The arm 4 and the socket 5 are made hollow, being provided with a duct 9 throughout their whole length. This duct 9 connects with the cup or receptacle 6 at the outer end of the arm and communicates with a similar duct 10 in the main shaft 11. The duct through the arm 4, the socket 5, and the shaft 11 is clearly shown in Figs. 1 and 5, and in the last-named figure the duct through the shaft 11 is shown to be on an incline, this arrangement being provided for the purpose of affording a free discharge of the mercury when the arm 4 is in the uppermost position. (Shown in dotted lines in Fig. 2.) The duct 10 in the shaft 11 leads to a funnel-shaped receptacle 13 outside the machine. This funnel-shaped receptacle receives the mercury discharged at each revolution of the arm 4 and transmits it through a pipe 14 to the place where the mercury is to be utilized for amalgamation or other purposes.

The object of making the mercury-reservoir 1 in two parts, as described, is in order that the mercury may be readily supplied to the reservoir when the latter has become emptied through use. It will be observed that a depression is made in the lower part of the reservoir, as shown at 50, and that the outer end of the arm 4 passes down into this depression. The object of this construction is to allow the taking up of substantially all the mercury by the revolving arm during the operation of the apparatus.

The upper half 2 of the reservoir 1 is joined to the lower half 3 by means of a hinge 15, the pivot-pin 16 of which serves as pin or shaft for part of the driving mechanism, and the whole is so made that it can be opened without disturbing any part of the mechanism. It is also so constructed that when closed it is practically dust proof, thereby facilitating the keeping of the mercury pure and clean. When the upper part 2 is closed down upon the lower part 3, the said parts may be fastened togther by a bolt and flange or otherwise, as shown at 17 18. If desired, a lock may be provided.

Inasmuch as mercury used in amalgamation under the conditions here intended to be met, as when the ore varies in richness or under other conceivable conditions, must be supplied or fed at intervals ranging through varying periods—say from once an hour to once in every few minutes—it becomes necessary to design a driving gear or mechanism that will meet these varied conditions, for which reason a mechanical motion, such as will now be described, has been invented as a part of the apparatus.

The motive power is here shown as taken from the cam-shaft 19 of a stamp-battery; but it is obvious that the power may be obtained from any other suitable source. To the shaft 19 is secured an eccentric 20, the same being preferably screwed into the shaft, although it may be secured thereto by any other appropriate means. The eccentric 20 acts upon a lever 21, pivoted at 22 and provided at its lower end with a spring-pressed pawl 23, acting upon a ratchet-wheel 24.

The said ratchet-wheel is mounted upon the pivot-pin 16 of the hinge 15. Accordingly the said pivot-pin forms the spindle on which the ratchet-wheel 24 is made to revolve. On the same spindle is mounted a cam-tooth 25, and in order to insure the cam-tooth and the ratchet-wheel being rigidly secured to each other the hub of the ratchet-wheel is preferably made square, as shown, for the reception of the cam-tooth 25.

Instead of a single cam-tooth, as shown in Fig. 12, the hub of the cam 25 may be provided with one, two, three, or four cam-teeth, as illustrated in Figs. 9, 8, 7, and 6, respectively. These different constructions are for the purpose of affording varying speeds to a pin-wheel 27, on which the cam 25 acts. By varying the number of teeth the revolutions of the pin-wheel 27 may be altered from one revolution per hour to twelve or more revolutions per hour, as may be required, the number of teeth on the cam being subject to change and thereby suited to various purposes.

To hold the pin-wheel 27 in any position in which it may be left by the action of the cam 25, a ratchet 28 is provided on the inner side of the wheel, and this ratchet is engaged by a spring 29, which engages at each stroke of the cam with the said ratchet, so as to hold it from being retracted after being pushed forward by the cam. Now the wheel 27 is mounted on the main shaft 11, already referred to, and the casing of the reservoir 1 forms, as described, the bearings for this shaft, thus making the driving mechanism a continuous whole with the mercury-reservoir itself.

The variation in the number of teeth upon the cam 25 provides for a variation in the number of revolutions of the feeding-arm 4, as will be readily understood; but such provision may also be made by means of a set-screw 30 and jam-nut 31, secured to a suitable bracket 61, as shown in Fig. 12. By adjusting the screw 30 and fixing this adjustment by means of the jam-nut 31 the length of stroke of the lever 21 may be varied, whereby the stroke of the pawl 23 can also be varied, making it take one or two or more teeth upon the ratchet at each stroke, as may be desired. The function of this part of the apparatus will be readily understood. The dimensions of the eccentric 20 will also have their effect in causing variations in the movement of the lever 21. If this eccentric be made to project considerably from the shaft 19, it will cause a larger stroke of the lever 21 than if it projects only slightly from the surface of the said shaft. In this way another method of varying the speed of revolution of the feeding-arm 4 may be provided.

The lever 21 is shown in Figs. 12 and 13 as being formed of about equal length above and below its fulcrum 22. Of course the parts above and below the fulcrum may be made of any proportionate length, and thereby still other means may be provided for varying the stroke of the lower part of the lever 21 and in this way varying the speed of revolution of the feeding-arm 4. The wearing-plate 32, of hardened steel to stand wear, may be attached to the upper end of the lever 21 where it comes in contact with the eccentric 20, and the eccentric itself may also be made of hardened steel to prevent excessive wear. A spring 33 bears upon the lever 21 on the side opposite to the bracket 61 for the purpose of moving the lever 21 back against the adjusting-screw 30 in the bracket, so as to insure that the lever 21 will be at rest until the eccentric 20 again comes in contact with the upper end of the lever.

The whole apparatus may be conveniently supported on a bracket upon a post 34, which may be the battery-post of a stamp-battery, or on the lower guide-rail. I have indicated at 35 a receptacle for conveying the mercury to the place where it is to be utilized.

I claim as my invention—

1. A mercury-feeder having a hermetically-closed two-part casing, and an arm having an axial support journaled between the sections of said casing and adapted to constitute a mercury-feeder, said arm having a duct leading through the axial support thereof through which the mercury is delivered.

2. An apparatus for supplying mercury to ore-crushing machinery, a mercury-reservoir formed in two halves, the upper half being hinged to the lower half, a feeding-arm inside the reservoir, and driving-gear for the feeding-arm, part of which is mounted on the driving-axle and the other part of the said driving-gear being mounted upon the pivot-pin of the reservoir-hinge.

3. An apparatus for supplying mercury to ore-crushing machinery, comprising a mercury-reservoir, a feeding-arm therein, provided with a longitudinal duct, and a shaft or axle for the feeding-bar, the said shaft or axle being also provided with a duct communicating with the duct in the feeding-arm.

4. An apparatus for supplying mercury to ore-crushing machinery, comprising a mercury-reservoir, a feeding-arm therein, provided with a longitudinal duct, and a shaft or axle for the feeding-bar, the said shaft or axle being also provided with an inclined duct communicating with the duct in the feeding-arm.

5. An apparatus for supplying mercury to ore-crushing machinery, comprising a mercury-reservoir, a feeding-arm therein, provided with a longitudinal duct, and a shaft or axle for the feeding-bar, the said shaft or axle being also provided with an inclined duct communicating with the duct in the feeding-arm, all in combination with a receptacle into which the last-named duct empties; the said receptacle communicating with a tube leading to the point where the mercury is to be utilized.

6. An apparatus for suppling mercury to ore-crushing machinery, comprising a mercury-reservoir, and a feeding-arm having a cup at one end and a longitudinal duct leading from said cup through said arm.

7. An apparatus for supplying mercury to ore-crushing machinery, comprising a mercury-reservoir, a feeding-arm supported on a rotary shaft, said feeding-arm being provided with a cup at its outer end and a duct leading from said cup to said shaft.

8. An apparatus for supplying mercury to ore-crushing machinery, comprising a mercury-reservoir, a feeding-arm supported on a rotary shaft, said feeding-arm being provided with a cup at its outer end, and being also provided with a longitudinal duct through said arm.

9. An apparatus for supplying mercury to ore-crushing machinery, comprising a mercury-reservoir, a feeding-arm therein adapted to revolve with a supporting-axle, a cup in the outer end of the feeding-arm, said cup having an opening therein and said arm having a duct therethrough, the said opening being at an angle of about forty-five degrees to the duct to give uniform capacity of cup, as and for the purpose set forth.

10. An apparatus for supplying mercury to ore-crushing machinery, comprising a mercury-reservoir, a feeding-arm therein, a shaft on which the feeding-arm is adapted to revolve, and means for detachably connecting the feed-arm to the shaft, such means consisting of a socket secured to the shaft, and screw connections between the socket and the arm.

11. An apparatus for supplying mercury to ore-crushing machinery, comprising a mercury-reservoir, a feeding-arm therein, a socket in which the feeding-arm is secured, and a shaft to which the socket is attached, the arm, the socket and the shaft being all provided with communicating ducts and the duct in the shaft being on an angle to insure free delivery.

12. An apparatus for supplying mercury to ore-crushing machinery, comprising a mercury-reservoir, a feeding-arm therein, means for operating the said feeding-arm, such means consisting of a driving-shaft with a cam or eccentric thereon, a reciprocating lever operated by the said cam, a ratchet-wheel operated by a pawl on the said lever, and a pin-wheel or its equivalent operated by a cam secured to the said ratchet.

13. An apparatus for supplying mercury to ore-crushing machinery, comprising a mercury-reservoir, a feeding-arm, means for operating the feeding-arm at varying speeds, such means consisting of a driving-shaft, an eccentric thereon, a reciprocating lever operated by the eccentric, and means for adjusting the throw of the lever.

14. An apparatus for supplying mercury to ore-crushing machinery, comprising a mercury-reservoir, a feeding-arm, means for operating the feeding-arm at varying speeds, such means consisting of a driving-shaft, an eccentric thereon, a reciprocating lever operated by the eccentric, and means for adjusting the throw of the lever, in combination with a spring for bringing the lever back to a position of rest.

In witness whereof I subscribe my signature in the presence of two witnesses.

PETER KIRKEGAARD.

Witnesses:
  W. A. HUNGERFORD,
  G. FRANK FRIES.